US010472145B2

(12) United States Patent
Lu (10) Patent No.: US 10,472,145 B2
(45) Date of Patent: Nov. 12, 2019

(54) LATERAL PULL ROD MECHANISM CONFIGURED TO LOCK STEEL TUBE SUPPORT ASSEMBLY

(71) Applicant: ZHEJIANG TIANYI MACHINERY CO., LTD., Huzhou, Zhejiang (CN)

(72) Inventor: Gengshen Lu, Zhejiang (CN)

(73) Assignee: ZHEJIANG TIANYI MACHINERY CO., LTD., Huzhou, Zhejiang (CN)

( * ) Notice: Subject to any disclaimer, the term of this patent is extended or adjusted under 35 U.S.C. 154(b) by 53 days.

(21) Appl. No.: 15/576,842

(22) PCT Filed: Dec. 1, 2015

(86) PCT No.: PCT/CN2015/096107
§ 371 (c)(1),
(2) Date: Nov. 26, 2017

(87) PCT Pub. No.: WO2016/201912
PCT Pub. Date: Dec. 22, 2016

(65) Prior Publication Data
US 2018/0162614 A1    Jun. 14, 2018

(30) Foreign Application Priority Data
Jun. 15, 2015    (CN) .................... 2015 2 0409889 U (51) Int. Cl.
*B65D 61/02*    (2006.01)
*B61D 45/00*    (2006.01)
(Continued)

(52) U.S. Cl.
CPC ........... *B65D 61/02* (2013.01); *B61D 45/008* (2013.01); *B65D 67/02* (2013.01); *B65D 85/20* (2013.01); *F16L 3/2235* (2013.01)

(58) Field of Classification Search
CPC ................... B65D 19/44; B65D 2590/0058; B65D 67/02; B65D 90/004; B65D 2519/00029; B65D 2519/00064
(Continued)

(56) References Cited

U.S. PATENT DOCUMENTS

| 4,610,362 A | 9/1986 | Remp et al. |
| 5,123,547 A | 6/1992 | Koch |

(Continued)

FOREIGN PATENT DOCUMENTS

| CN | 1055522 A | 10/1991 |
| CN | 201049795 Y | 4/2008 |

(Continued)

OTHER PUBLICATIONS

The Japanese 1st Office Action dated Jan. 8, 2019 for a Japanese Application No. 2017-564392.
(Continued)

*Primary Examiner* — D Glenn Dayoan
*Assistant Examiner* — Sunsurraye Westbrook
(74) *Attorney, Agent, or Firm* — Yue (Robert) Xu; Apex Attorneys at Law, LLP (57) ABSTRACT

A lateral pull rod mechanism configured to lock a steel pipe support assembly includes a pull rod, an upper connecting plate, a pull rod through hole provided in the upper connecting plate, a lower connecting plate, a lower lateral pull rod clamping groove provided in the lower connecting plate, an intermediate connecting block provided between the upper connecting plate and the lower connecting plate, an intermediate lateral pull rod clamping groove provided in the intermediate connecting block, a threaded section provided at an upper end of the pull rod, a fastening nut configured to be screwed onto the threaded section, an anti-disengaging portion provided at a lower end of the pull
(Continued)

rod and configured to prevent the pull rod from vertically disengaging from the lower lateral pull rod clamping groove, and a lateral stopping plate configured to prevent the anti-disengaging portion from sliding outwards.

13 Claims, 5 Drawing Sheets (51) Int. Cl.
*B65D 67/02* (2006.01)
*B65D 85/20* (2006.01)
*F16L 3/223* (2006.01)

(58) Field of Classification Search
USPC ... 410/47, 49, 155, 42, 87, 117, 36, 143, 44, 410/50, 100; 414/458, 60, 800, 809, 910, 414/23, 498
See application file for complete search history.

(56) References Cited

U.S. PATENT DOCUMENTS

| | | | | |
|---|---|---|---|---|
| 5,267,648 A * | 12/1993 | Baker | ............ | B65D 61/00 206/446 |
| 5,649,632 A | 7/1997 | Terashima et al. | | |
| 6,261,037 B1 * | 7/2001 | Richards | ............ | B65D 85/20 410/36 |
| 6,322,034 B1 * | 11/2001 | O'Malley | ............ | B65D 19/44 248/346.02 |
| 6,599,069 B2 * | 7/2003 | Ross | ............ | B65D 85/20 410/34 |
| 7,080,864 B2 | 7/2006 | Casteran | | |
| 8,807,612 B2 * | 8/2014 | Hagelskjaer | ............ | B65D 85/62 211/60.1 |
| 2009/0206210 A1 | 8/2009 | Qiao | | |
| 2012/0093608 A1 | 4/2012 | Kovacs, Jr. | | |

FOREIGN PATENT DOCUMENTS

| | | |
|---|---|---|
| CN | 102658917 A | 9/2012 |
| CN | 203158534 U | 8/2013 |
| CN | 104875955 A | 9/2015 |
| CN | 204713703 U | 10/2015 |
| EP | 0071163 A2 | 2/1983 |
| JP | S5864968 A | 4/1983 |
| JP | H03505077 A | 11/1991 |
| JP | H0811923 A | 1/1996 |
| JP | 3163785 U | 11/2010 |

OTHER PUBLICATIONS

The European Search Report for EP15895478.4, dated Apr. 19, 2018.
International Search Report for PCT/CN2015/096107, dated Mar. 9, 2016, ISA/CN.

* cited by examiner

LATERAL PULL ROD MECHANISM CONFIGURED TO LOCK STEEL TUBE SUPPORT ASSEMBLY

CROSS-REFERENCE TO RELATED APPLICATIONS

The present application is the national phase of International Application No. PCT/CN2015/096107, titled "LATERAL PULL ROD MECHANISM CONFIGURED TO LOCK STEEL TUBE SUPPORT ASSEMBLY", filed on Dec. 1, 2015, which claims the benefit of priority to Chinese patent application No. 201520409889.9, filed with the Chinese State Intellectual Property Office on Jun. 15, 2015, the entire disclosures of both applications are incorporated herein by reference.

FIELD

The present application relates to the technical field of steel pipes transportation, and more particularly to a lateral pull rod mechanism configured to lock a steel pipe support assembly.

BACKGROUND

Steel pipes need to be stacked and transported after being manufactured, and during the stacking process and the transportation process, in order to prevent the manufactured steel pipe from being damaged, the steel pipes are placed on a support device during the stacking process and the transportation process. A packaging, stacking, transporting and support device is disclosed in a Chinese Utility Model Patent No. CN 201049795U published on Apr. 23, 2010, which includes an intermediate support member separating the steel pipes from each other and a bundling steel belt configured to bundle the multiple steel pipes. The intermediate support member has an upper row and a lower row of circular arc-shaped grooves matching with the shape of the steel pipe, the material of the intermediate support member is high strength plastic, the device in the Utility Model for packaging, stacking, transporting and supporting the steel pipes can prevent the steel pipes from colliding with each other and from rubbing against each other, thereby protecting the surfaces of the steel pipes from being damaged.

However, currently, when the steel pipes are stacked by using the transporting and support device, the steel pipes need to be fastened after being stacked, and the fastening process has many procedures and is slow, complicated to operate and time consuming and takes great effort.

SUMMARY

An object of the present application is to provide a lateral pull rod mechanism configured to lock a steel pipe support assembly, which can address the deficiencies of the conventional technology, and has a novel structure and a low cost, is convenient to manufacture and easy to operate, and saves time and effort.

The present application is realized through the following technical solutions. A lateral pull rod mechanism configured to lock a steel pipe support assembly includes a pull rod, an upper connecting plate, a pull rod through hole provided in the upper connecting plate, a lower connecting plate, a lower lateral pull rod clamping groove provided in the lower connecting plate, an intermediate connecting block provided between the upper connecting plate and the lower connecting plate, an intermediate lateral pull rod clamping groove provided in the intermediate connecting block, a threaded section provided at an upper end of the pull rod, a fastening nut configured to be screwed onto the threaded section, an anti-disengaging portion provided at a lower end of the pull rod and configured to prevent the pull rod from vertically disengaging from the lower lateral pull rod clamping groove, and a lateral stopping plate configured to prevent the anti-disengaging portion from sliding outwards.

According to the structure in the present application, first, the intermediate lateral pull rod clamping groove and the lower lateral pull rod clamping groove together form a passage allowing the pull rod to be placed in from the lateral side; second, after the pull rod is laterally placed in the passage, by performing a lifting operation, the anti-disengaging portion is blocked vertically; then, the nut at the upper end is screwed onto the threaded section at the upper end of the pull rod, to ensure that the pull rod will not move vertically; and meanwhile, the lateral stopping plate restricts the anti-disengaging portion laterally, which can ensure that the pull rod will not slide out of the passage laterally.

The steel pipe support device having the vertical connecting mechanism in the present application is compared with the conventional structures, for example, in FIG. 1 of the U.S. Pat. No. 7,080,864 B2, the lifting of a bundle of steel pipes requires several sets of steel pipe support devices (normally 2 to 4 sets), each set of steel pipe support devices is composed of a number of holders (equivalent to the steel pipe support frame of the present application) and fixing parts (equivalent to the vertical connecting mechanism) at two sides of the holders.

The installation method is described as follows.

First, the holders of each layer are connected to the corresponding connectors. For example, two ends of the lowest layer holder are respectively connected to two bottom connectors; two ends of the intermediate layer holder are respectively connected to two U-shaped components; and the uppermost layer holder is connected to two upper connectors. Second, several bottom layer holders are placed on a worktable according to the number of the sets of the bundled holders, to ensure that the grooves of the holders are aligned in the axial direction to facilitate the placement of the steel pipes. Then the first layer of steel pipes are placed on the lowest layer holder, then the intermediate layer holder is placed on the first layer of steel pipes, and then the steel pipes are placed on the intermediate layer holder, and the above process is repeated, and finally the uppermost layer holder is placed. At this time, the arrangement of the steel pipes and the holders is finished.

Then the next step is proceeded to fix each set of holders.

As for the holders in the U.S. Pat. No. 7,080,864 B2, at this time, two threaded rods are required to pass through the upper connectors, the U-shaped connectors, and the bottom connectors from top to bottom in sequence, and are finally screwed into the nuts pre-installed and fixed in the bottom connectors, and then the top layer nuts are screwed onto the upper ends of the threaded rods to realize the locking of the whole device. The alignment is difficult during the process of installing the threaded rods, an operator is required to operate on the side where the lateral pull rod mechanism is located, and further, the torque transmission is also hard, a clamp is required to clamp the threaded rod for screwing.

On the contrary, by using the vertical connecting mechanism according to the present application, the step of twisting the pull rod to screw the pull rod into the nut is directly omitted, and the pull rod can be directly placed into the passage from the lateral side, and then be lifted to be tensioned, and finally the pull rod is locked by a nut at the upper end. Since the work piece is designed to have a certain allowance, when placing the pull rod laterally, it is not required to align very precisely as required in the situation using the nuts, and the operator can complete the operation at one side of the worktable, which is suitable for some factories having the defects that the operation on both sides is not allowed due to the limited space. Moreover, the present application omits the time-consuming operation of using tools to fix the pull rod to the nut, and thus saves the tools.

As a preferred solution, an anti-rotating portion is provided between the pull rod and the anti-disengaging portion, and is configured to cooperate with the intermediate lateral pull rod clamping groove to prevent rotation of the pull rod.

As a preferred solution, the anti-rotating portion has two anti-rotating lateral surfaces configured to cooperate with the intermediate lateral pull rod clamping groove.

As a preferred solution, the pull rod, the anti-disengaging portion and the anti-rotating portion are integrally formed or welded into an integral unit.

As a preferred solution, the lateral stopping plate is formed by a bent end of the lower connecting plate; or, the lateral stopping plate includes a bottom plate fixedly connected to the lower connecting plate and a bent plate connected to the bottom plate.

As a preferred solution, the intermediate connecting block includes a connecting body, an inserting body provided at an end of the connecting body, and a pair of stopping blocks provided on the connecting body; the intermediate lateral pull rod clamping groove is arranged on the connecting body at an end away from the inserting body; the inserting body has a rectangular cross section, and two lateral surfaces of the inserting body in a width direction of the inserting body are each provided with an elongated groove extending along a length direction of the inserting body; and a concave cavity is provided at an end surface of the inserting body.

As a preferred solution, a lower connecting block is provided at an end portion of the lower connecting plate, and the lower connecting block is provided with an insertedly connecting cavity, an open slot in communication with the insertedly connecting cavity, an end stopping edge located at an end of the open slot, and a bottom opening provided in a bottom lateral surface opposite to the open slot.

As a preferred solution, the lateral pull rod mechanism further includes lateral baffles located at two sides of the bottom opening respectively and a guiding installation groove formed by the lateral baffles and side walls of the insertedly connecting cavity.

As a preferred solution, a lower connecting block is provided at an end portion of the lower connecting plate, and the lower connecting block is provided with an insertedly connecting cavity, an open slot in communication with the insertedly connecting cavity, an end stopping edge located at an end of the open slot, and a bottom groove opposite to the open slot, and a bottom wall of the bottom groove forms a bottom connecting plate.

As a preferred solution, a position limiting lateral surface is provided on the anti-disengaging portion to prevent rotation of the pull rod.

A lateral pull rod mechanism configured to lock a steel pipe support assembly includes a pull rod, an upper connecting plate, an upper lateral pull rod clamping groove provided in the upper connecting plate, a lower connecting plate, a lower lateral pull rod clamping groove provided in the lower connecting plate, an intermediate connecting block provided between the upper connecting plate and the lower connecting plate, an intermediate lateral pull rod clamping groove provided in the intermediate connecting block, a threaded section provided at an upper end of the pull rod, a fastening nut configured to be screwed onto the threaded section, an anti-disengaging portion provided at a lower end of the pull rod and configured to prevent the pull rod from vertically disengaging from the lower lateral pull rod clamping groove, a lateral stopping plate configured to prevent the anti-disengaging portion from sliding outwards, and an anti-rotating portion configured to prevent rotation of the pull rod; and the upper connecting plate is further provided with a stopping plate configured to prevent the fastening nut from disengaging from the upper lateral pull rod clamping groove.

In this technical solution, the upper lateral pull rod clamping groove, the intermediate lateral pull rod clamping groove and the lower lateral pull rod clamping groove together form a passage allowing the pull rod to be placed in from the lateral side; second, after the pull rod is laterally placed in the passage, by performing a lifting operation, the anti-disengaging portion is blocked vertically; then, the nut at the upper end is screwed onto the threaded section at the upper end of the pull rod, to ensure that the pull rod will not move vertically; meanwhile, the lateral stopping plate restricts the anti-disengaging portion laterally, which can ensure that the pull rod will not slide out of the passage laterally, and the fastening nut on the upper end of the pull rod is blocked by the stopping plate, thereby realizing the lateral blocking at the top and the bottom. With such structure, the installation is faster and more convenient.

As a preferred solution, the stopping plate includes a plate body having an open slot and end extending plates provided on the plate body and located at two sides of the open slot respectively.

As a preferred solution, the anti-rotating portion is provided between the pull rod and the anti-disengaging portion, and has an anti-rotating lateral surface configured to cooperate with the intermediate lateral pull rod clamping groove.

As a preferred solution, the anti-rotating portion includes a position limiting lateral surface provided on the anti-disengaging portion.

In conclusion, the present application has the following beneficial effects. The present application has a simple structure and a low cost, is convenient to manufacture, simple to operate, and saves time and effort.

DETAILED DESCRIPTION

The present application is further described in detail hereinafter with reference to the drawings.

The specific embodiments are only intended to explain the present application, rather than limit the present application. Modifications without creative contribution may be made to the embodiments by the person skilled in the art as needed after reading the specification, and these modifications within the scope of the claims of the present application are protected under the Patent Law.

An embodiment: as shown in FIGS. 1-4, FIG. 1 shows a steel pipe support device adopting this embodiment, which includes multiple steel pipe support frames arranged from bottom to top in sequence and in parallel with each other, and two vertical connecting mechanisms 2 arranged at two ends of the multiple steel pipe support frames and configured to connect the multiple steel pipe support frames. There are two of the vertical connecting mechanisms 2, which is embodied as a lateral pull rod mechanism configured to lock a steel pipe support assembly. The lateral pull rod mechanism includes a pull rod 201, an upper connecting plate 208, a pull rod through hole 202 provided in the upper connecting plate 208, a lower connecting plate 209, a lower lateral pull rod clamping groove 210 provided in the lower connecting plate 209, an intermediate connecting block 211 provided between the upper connecting plate 208 and the lower connecting plate 209, an intermediate lateral pull rod clamping groove 212 provided in the intermediate connecting block 211, a threaded section 203 provided at an upper end of the pull rod 201, a fastening nut 204 screwed onto the threaded section 203, an anti-disengaging portion 205 arranged at a lower end of the pull rod 201 and configured to prevent the pull rod 201 from vertically disengaging from the lower lateral pull rod clamping groove 210, and a lateral stopping plate 206 configured to prevent the anti-disengaging portion 205 from sliding outwards.

Figure 1:
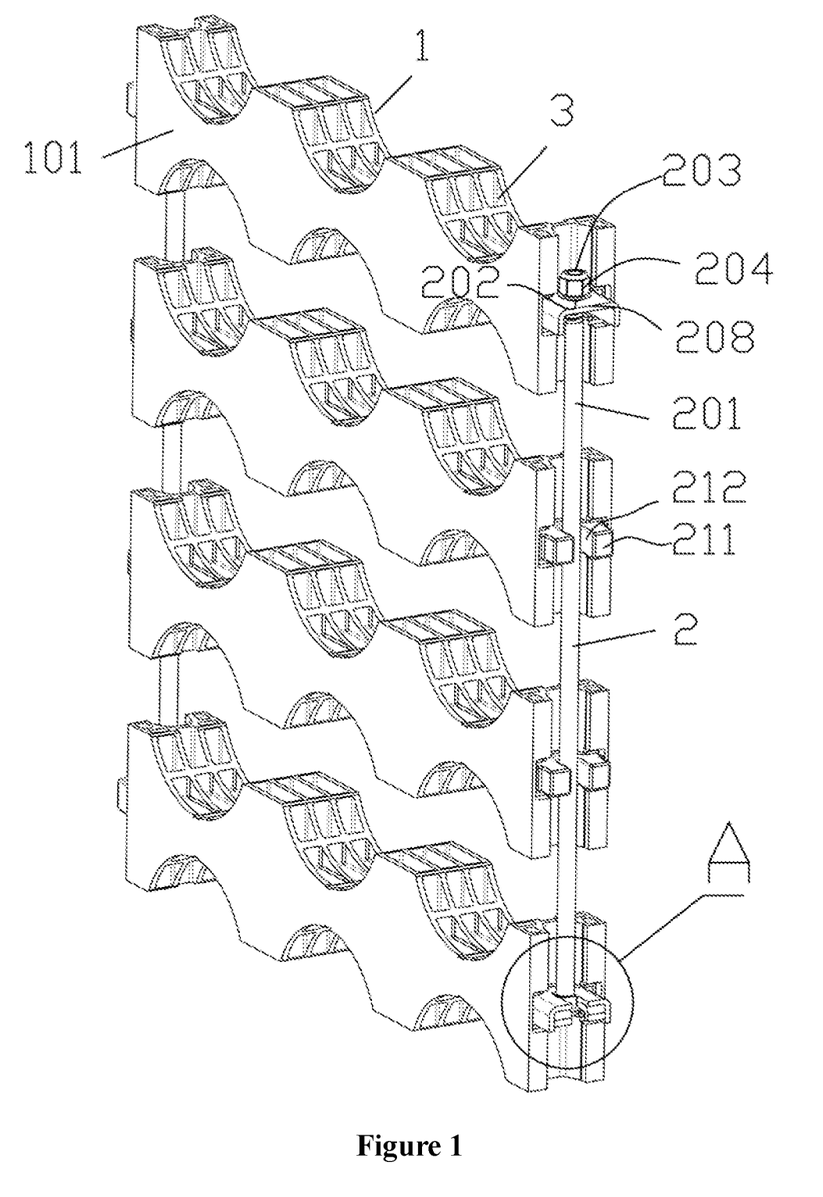
FIG. 1 is a schematic view showing the application of a first embodiment of the present application.
Figure 2:
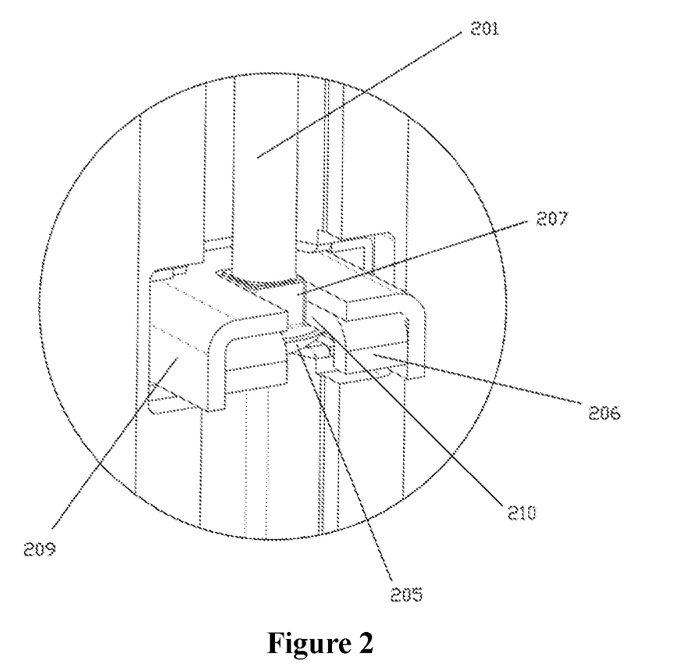
FIG. 2 is a partially enlarged view showing a portion A in FIG. 1.
Figure 4:
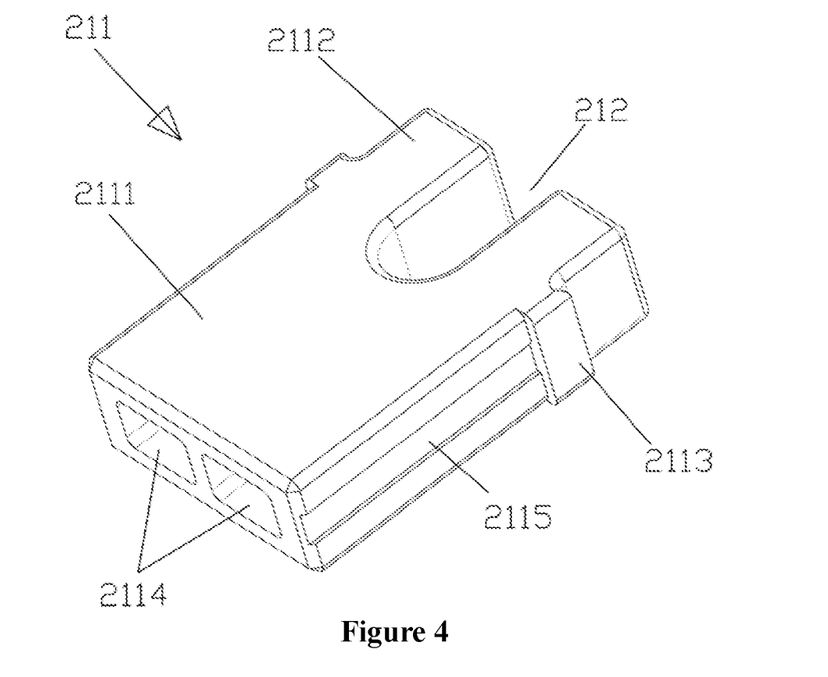
FIG. 4 is a schematic view showing the structure of an intermediate connecting block.

The upper connecting plate 208 is disposed on the uppermost steel pipe support frame; the lower connecting plate 209 is disposed on the lowest steel pipe support frame; the lower lateral pull rod clamping groove 210 is disposed in the lower connecting plate 209, and the intermediate connecting block 211 is disposed on each of the remaining steel pipe support frames. The intermediate connecting block 211 is made from plastic. The intermediate connecting block 211 includes a connecting body 2111, an inserting body 2112 disposed at an end of the connecting body 2111, and a pair of stopping blocks 2113 disposed on the connecting body 2111. The intermediate lateral pull rod clamping groove 212 is disposed in the connecting body 2111 at an end close to the inserting body 2112. The inserting body 2112 has a rectangular cross section, and two lateral surfaces of the inserting body 2112 in the width direction thereof are each provided with an elongated slot 2115 extending along the length direction of the inserting body 2112. A concave cavity 2114 is disposed at an end surface of the connecting body 2111, and two of the concave cavities 2114 are provided.

Figure 3:
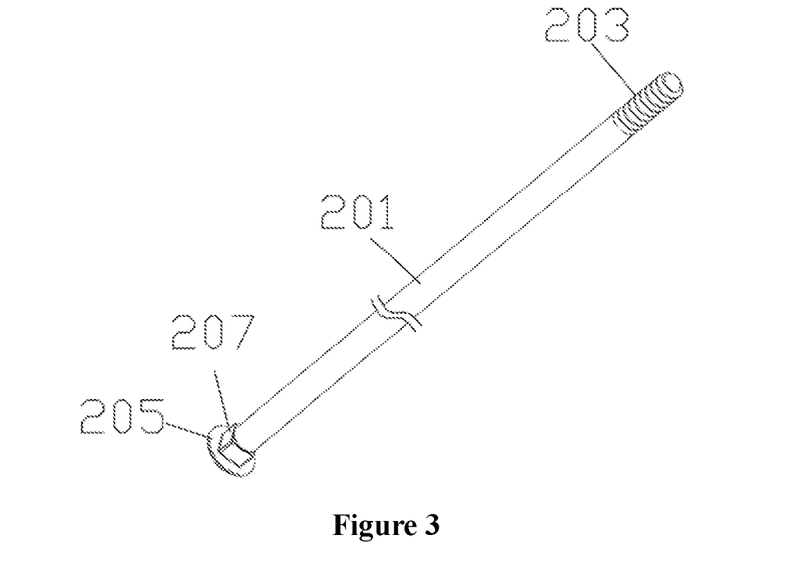
FIG. 3 is a schematic view showing the structure of the pull rod in FIG. 1.

The pull rod 201 is a rigid rod, and the cross section of the pull rod 201 is circular or polygonal or the like. The pull rod 201 normally employs a steel rod. The pull rod through hole 202 is a through hole provided in the upper connecting plate 208. The upper connecting plate 208 is inserted into an uppermost support inner core, the lower connecting plate is inserted into a lowest support inner core. The intermediate connecting block 211 is made from plastic, and is fixedly inserted into a support inner core. Similarly, the uppermost steel pipe support frame is provided with an upper connecting block inserted into the corresponding support inner core, the upper connecting block is completely or partially made from plastic, and can have a protective function. The lowest steel pipe support frame is provided with a lower connecting block made from plastic and inserted into the corresponding support inner core. By providing the intermediate lateral pull rod clamping groove 212 and the lower lateral pull rod clamping groove 210, a passage allowing entrance of the pull rod is formed, which allows the pull rod to enter the passage from the lateral side, thereby facilitating the installation. A pair of positioning planes cooperating with each other is disposed on the anti-disengaging portion 205 and the bottom of the lower connecting plate respectively, and by providing the pair of positioning planes, it can ensure the pull rod to be vertical and prevent the pull rod from inclining, to avoid affecting the fixing effect of the steel pipes. A bottom surface of the anti-disengaging portion 205 is a spherical surface. The vertical connecting mechanism 2 further includes a lateral stopping plate 206 configured to prevent the anti-disengaging portion 205 from sliding outwards. The lateral stopping plate 206 is formed by bending an end portion of the lower connecting plate, or the lateral stopping plate 206 is fixed onto the lower connecting plate and has a bent end portion. The lateral stopping plate 206 prevents the anti-disengaging portion 205 from sliding out of the lower lateral pull rod clamping groove 210, thereby preventing the lower end of the pull rod from inclining. An anti-rotating portion 207 is provided between the pull rod 201 and the anti-disengaging portion 205, and cooperates with the lower lateral pull rod clamping groove 210 to prevent rotation of the pull rod 201. The anti-rotating portion 207 is configured to prevent rotation of the pull rod 201, to facilitate installing the fastening nut onto the threaded section 203. In order to cooperate with the two lateral surfaces of the lower lateral pull rod clamping groove 210, the anti-rotating portion 207 is provided with two anti-rotating lateral surfaces. The anti-rotating portion 207 is rectangular in this embodiment, and may also be a polygonal body, or an approximately polygonal body, or a cylinder with two anti-rotating lateral surfaces machined on its outer surface. The pull rod 201, the anti-disengaging portion and the anti-rotating portion may be integrally formed or welded into an integral unit and are not detachable.

Figure 5:
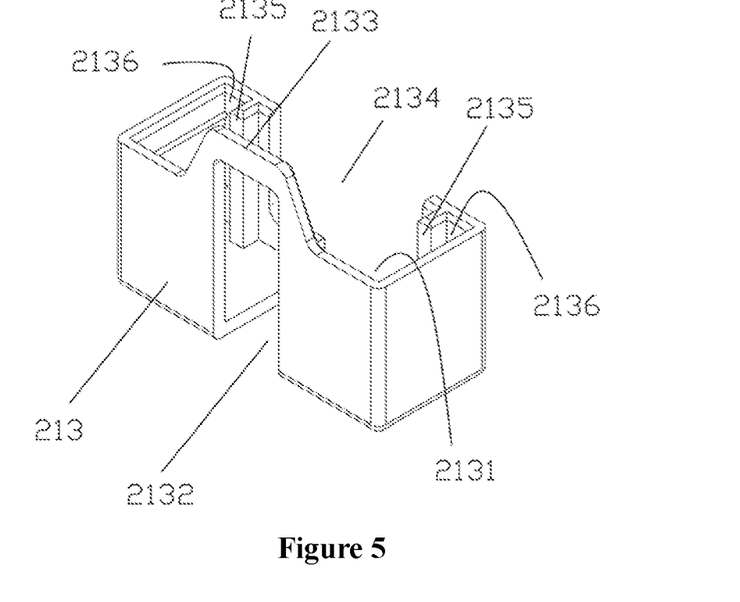
FIG. 5 is a schematic view showing the structure of a lower connecting block.
Figure 6:
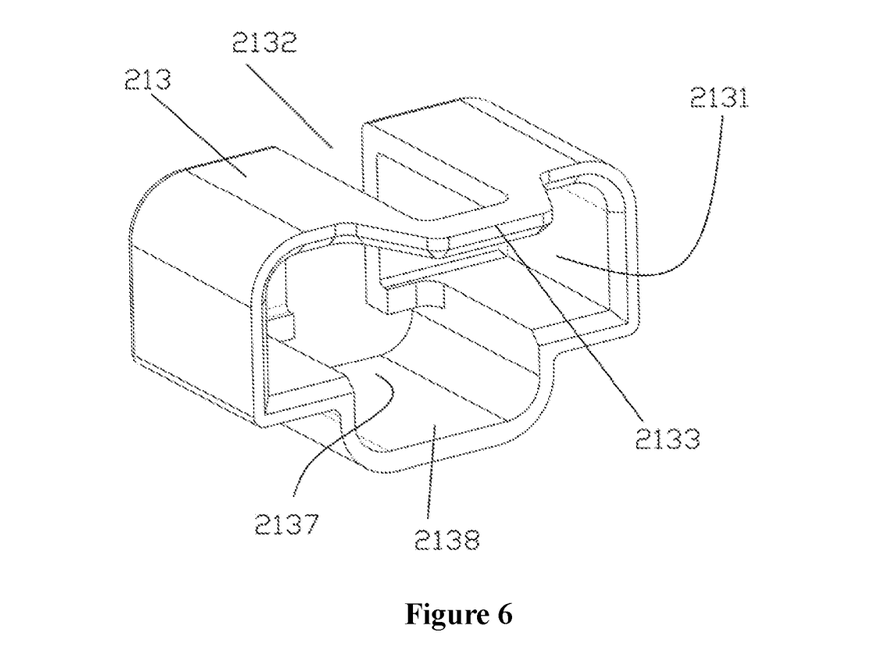
FIG. 6 is a schematic view showing the structure of another lower connecting block.

A lower connecting block 213 is provided at an end portion of the lower connecting plate 209, the lower connecting block is inserted into the end portion of the lower connecting plate, and the lower connecting block is made from plastic or other materials. Reference is made to FIG. 5, which is a structural view of the lower connecting block 213. The lower connecting block 213 is a hollow shell structure, on which an insertedly connecting cavity 2131 and an open slot 2132 in communication with the insertedly connecting cavity are provided. The open slot 2132 is configured to allow the pull rod to pass through, an end portion stopping edge 2133 is formed at the end of the open slot 2132, and a bottom opening 2134 is provided in the bottom lateral surface opposite to the open slot 2132. Two lateral baffles 2135 are arranged at two sides of the bottom opening 2134, and a guiding installation groove 2136 is formed between the lateral baffles 2135 and the lateral plate of the hollow shell. During installation, the lateral plate of the extended end of the lower connecting plate is inserted into the guiding installation groove 2136. Referring to FIG. 6, the lower connecting block 213 may also adopt the structure shown in FIG. 6. The lower connecting block 213 is a hollow shell structure, on which an insertedly connecting cavity 2131 and an open slot 2132 in communication with the insertedly connecting cavity are provided. The open slot 2132 is configured to allow the pull rod to pass through, and an end stopping edge 2133 is formed at the end of the open slot 2132 to prevent the pull rod from sliding out laterally. The bottom lateral wall opposite to the opened slot 2132 (i.e., another lateral surface opposite to the lateral surface where the open slot is disposed) protrudes downwards to form a bottom groove 2137. The bottom of the bottom groove 2137 is a bottom connecting plate 2138, which ensures the integrality of the whole lower connecting block 213.

Figure 7:
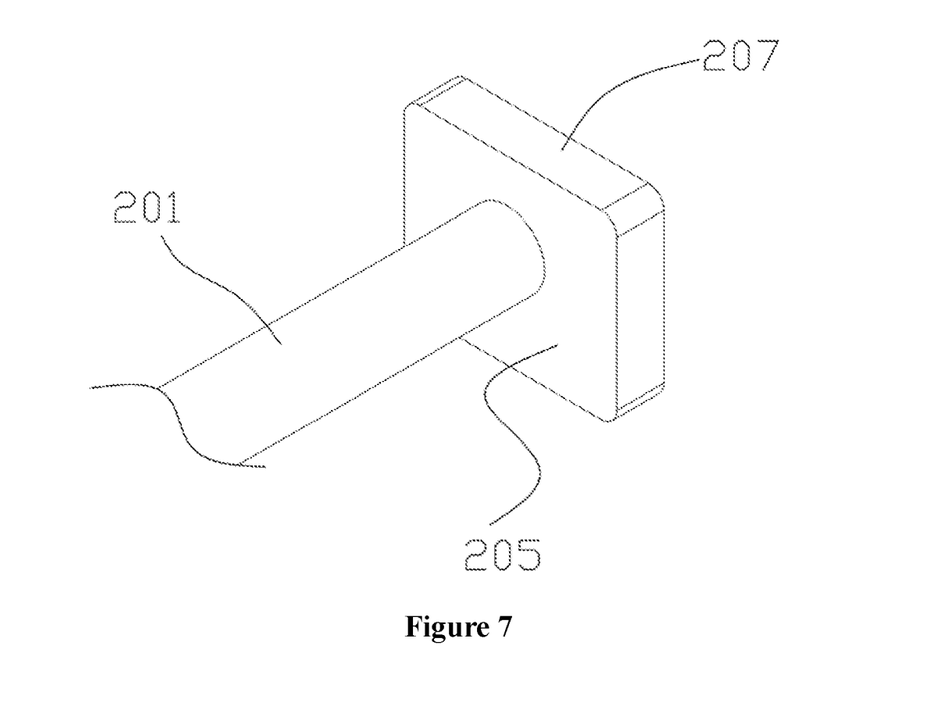
FIG. 7 is a schematic view showing the structure of a second embodiment of the present application.

A second embodiment may refer to FIG. 7. In this embodiment, the anti-rotating portion 207 is not arranged between the pull rod 201 and the anti-disengaging portion 205, but is arranged on a position limiting lateral surface of the anti-disengaging portion 205. The number of the position limiting lateral surface is one, two, three, four, five, or six, and it must ensure that at least one position limiting lateral surface cooperates with the lateral plate of the lower connecting plate 209, to prevent rotation of the pull rod 201. The rest part of this embodiment is the same as the first embodiment.

Figure 8:
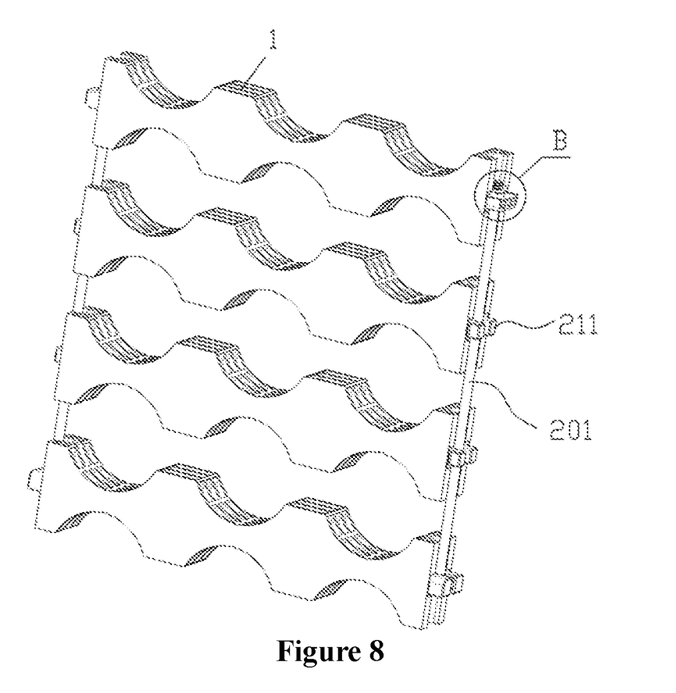
FIG. 8 is a structural schematic view showing the application of a third embodiment of the present application.
Figure 9:
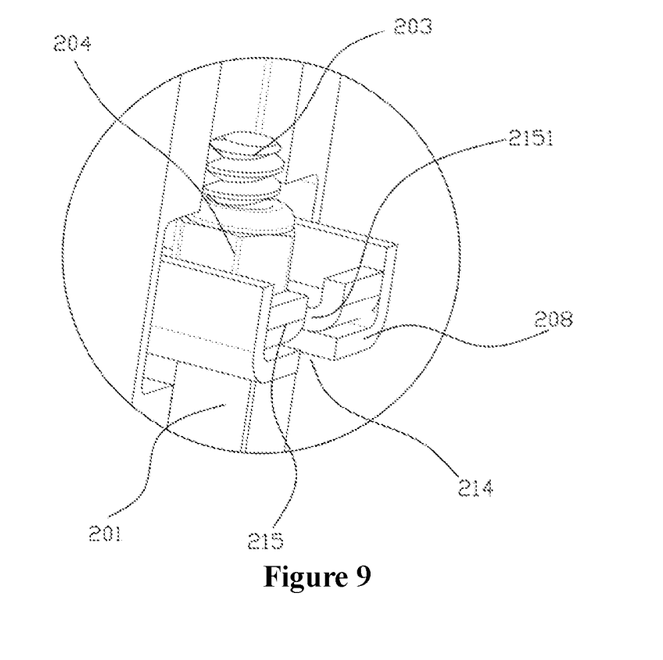
FIG. 9 is a partially enlarged view showing a portion B in FIG. 8.

A third embodiment may refer to the FIG. 8 and FIG. 9. A lateral pull rod mechanism configured to lock a steel pipe support assembly includes a pull rod 201, an upper connecting plate 208, an upper lateral pull rod clamping groove 214 provided in the upper connecting plate 208, a lower connecting plate 209, a lower lateral pull rod clamping groove 210 provided in the lower connecting plate 209, an intermediate connecting block 211 provided between the upper connecting plate 208 and the lower connecting plate 209, an intermediate lateral pull rod clamping groove 212 provided in the intermediate connecting block 211, a threaded section 203 provided at an upper end of the pull rod 201, a fastening nut 204 screwed onto the threaded section 203, an anti-disengaging portion 205 provided at a lower end of the pull rod 201 and configured to prevent the pull rod 201 from vertically disengaging from the lower lateral pull rod clamping groove 210, and a lateral stopping plate 206 configured to prevent the anti-disengaging portion 205 from sliding outwards. An anti-rotating portion 207 is provided between the pull rod 201 and the anti-disengaging portion 205, and cooperates with the intermediate lateral pull rod clamping groove 212 to prevent rotation of the pull rod 201. The upper connecting plate 208 is further provided with a stopping plate 215 configured to prevent the fastening nut 204 from disengaging from the upper lateral pull rod clamping groove 214. The anti-rotating portion 207 is configured to prevent rotation of the pull rod 201, to facilitate installing the fastening nut onto the threaded section 203. In order to cooperate with the two lateral surfaces of the lower lateral pull rod clamping groove 210, the anti-rotating portion 207 is provided with two anti-rotating lateral surfaces. The anti-rotating portion 207 is rectangular in this embodiment, and may also be a polygonal body, or an approximately polygonal body, or a cylinder, and the two anti-rotating lateral surfaces are machined on the outer surface of the anti-rotating portion 207. The pull rod, the anti-disengaging portion and the anti-rotating portion may be integrally formed or welded into an integral unit and are not detachable. Similarly, a lower connecting block 213 is provided at an end portion of the upper connecting plate 208. In addition, rather being arranged between the pull rod 201 and the anti-disengaging portion 205, the anti-rotating portion 207 may also not arranged on a position limiting lateral surface of the anti-disengaging portion 205. The number of the position limiting lateral surface is one, two, three, four, five, or six, and it must ensure that at least one position limiting lateral surface cooperates with the lateral plate of the lower connecting plate 209, to prevent rotation of the pull rod 201.

The stopping plate 215 includes a plate body having an open slot and end extending plates provided on the plate body and located at two sides of the open slot respectively. The stopping plate 215 is fixedly connected to the upper connecting plate 208 by welding or screw connection. In addition, the stopping plate may also be made of two separate plates each having a bent end, and the plates are fixedly connected to the upper connecting plate 208 by welding or screw connection. The stopping plate 215 may also be integrally formed with the upper connecting plate 208, and be formed by the bent end of the upper connecting plate 208.

Unlike the first embodiment, in this embodiment, the upper connecting plate 208 is provided with the upper lateral pull rod clamping groove 214, rather than a through hole, and the upper lateral pull rod clamping groove 214 is limited by the stopping plate 205 to prevent the fastening nut 204 from falling out. With such structure, when using the lateral pull rod mechanism, the pull rod is allowed to be connected to the steel pipe support frame from the lateral side integrally, which is very convenient.

What is claimed is:

1. A lateral pull rod mechanism configured to lock a steel pipe support assembly, comprising a pull rod, an upper connecting plate, a pull rod through hole provided in the upper connecting plate, a lower connecting plate, a lower lateral pull rod clamping groove provided in the lower connecting plate, an intermediate connecting block provided between the upper connecting plate and the lower connecting plate, an intermediate lateral pull rod clamping groove provided in the intermediate connecting block, a threaded section provided at an upper end of the pull rod, a fastening nut configured to be screwed onto the threaded section, an anti-disengaging portion provided at a lower end of the pull rod and configured to prevent the pull rod from vertically disengaging from the lower lateral pull rod clamping groove, and a lateral stopping plate configured to prevent the anti-disengaging portion from sliding outwards;
   wherein an anti-rotating portion is provided between the pull rod and the anti-disengaging portion, and is configured to cooperate with the lower lateral pull rod clamping groove to prevent rotation of the pull rod.

2. The lateral pull rod mechanism configured to lock the steel pipe support assembly according to claim 1, wherein the anti-rotating portion has two anti-rotating lateral surfaces configured to cooperate with the lower lateral pull rod clamping groove.

3. The lateral pull rod mechanism configured to lock the steel pipe support assembly according to claim 1, wherein the pull rod, the anti-disengaging portion and the anti-rotating portion are integrally formed or welded into an integral unit.

4. The lateral pull rod mechanism configured to lock the steel pipe support assembly according to claim 1, wherein the lateral stopping plate is formed by a bent end of the lower connecting plate; or, the lateral stopping plate comprises a bottom plate fixedly connected to the lower connecting plate and a bent plate connected to the bottom plate.

5. The lateral pull rod mechanism configured to lock the steel pipe support assembly according to claim 1, wherein the intermediate connecting block comprises a connecting body, an inserting body provided at an end of the connecting body, and a pair of stopping blocks provided on the connecting body; the intermediate lateral pull rod clamping groove is arranged on the connecting body at an end close to the inserting body; the inserting body has a rectangular cross section, and two lateral surfaces of the inserting body in a width direction of the inserting body are each provided with an elongated groove extending along a length direction of the inserting body; and a concave cavity is provided at an end surface of the connecting body.

6. The lateral pull rod mechanism configured to lock the steel pipe support assembly according to claim 1, wherein a lower connecting block is provided at an end portion of the lower connecting plate, and the lower connecting block is provided with an insertedly connecting cavity, an open slot in communication with the insertedly connecting cavity, an end stopping edge located at an end of the open slot, and a bottom opening provided in a bottom lateral surface opposite to the open slot.

7. The lateral pull rod mechanism configured to lock the steel pipe support assembly according to claim 6, further comprising lateral baffles located at two sides of the bottom opening respectively and a guiding installation groove formed by the lateral baffles and side walls of the insertedly connecting cavity.

8. The lateral pull rod mechanism configured to lock the steel pipe support assembly according to claim 1, wherein a lower connecting block is provided at an end portion of the lower connecting plate, and the lower connecting block is provided with an insertedly connecting cavity, an open slot in communication with the insertedly connecting cavity, an end stopping edge located at an end of the open slot, and a bottom groove opposite to the open slot, and a bottom wall of the bottom groove forms a bottom connecting plate.

9. The lateral pull rod mechanism configured to lock the steel pipe support assembly according to claim 1, wherein a position limiting lateral surface is provided on the anti-disengaging portion to prevent rotation of the pull rod.

10. A lateral pull rod mechanism configured to lock a steel pipe support assembly, comprising a pull rod, an upper connecting plate, an upper lateral pull rod clamping groove provided in the upper connecting plate, a lower connecting plate, a lower lateral pull rod clamping groove provided in the lower connecting plate, an intermediate connecting block provided between the upper connecting plate and the lower connecting plate, an intermediate lateral pull rod clamping groove provided in the intermediate connecting block, a threaded section provided at an upper end of the pull rod, a fastening nut configured to be screwed onto the threaded section, an anti-disengaging portion provided at a lower end of the pull rod and configured to prevent the pull rod from vertically disengaging from the lower lateral pull rod clamping groove, a lateral stopping plate configured to prevent the anti-disengaging portion from sliding outwards, and an anti-rotating portion configured to prevent rotation of the pull rod; and the upper connecting plate is further provided with a stopping plate configured to prevent the fastening nut from disengaging from the upper lateral pull rod clamping groove.

11. The lateral pull rod mechanism configured to lock the steel pipe support assembly according to claim 10, wherein the stopping plate comprises a plate body having an open slot, and end extending plates provided on the plate body and located at two sides of the open slot respectively.

12. The lateral pull rod mechanism configured to lock the steel pipe support assembly according to claim 10, wherein the anti-rotating portion is provided between the pull rod and the anti-disengaging portion, and has an anti-rotating lateral surface configured to cooperate with the intermediate lateral pull rod clamping groove.

13. The lateral pull rod mechanism configured to lock the steel pipe support assembly according to claim 10, wherein the anti-rotating portion comprises a position limiting lateral surface provided on the anti-disengaging portion.

* * * * *